United States Patent
Mori

(10) Patent No.: US 11,394,878 B2
(45) Date of Patent: Jul. 19, 2022

(54) IMAGE CAPTURING APPARATUS, METHOD OF CONTROLLING IMAGE CAPTURING APPARATUS, AND STORAGE MEDIUM

(71) Applicant: CANON KABUSHIKI KAISHA, Tokyo (JP)

(72) Inventor: Kensaku Mori, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/028,880

(22) Filed: Sep. 22, 2020

(65) Prior Publication Data

US 2021/0099641 A1  Apr. 1, 2021

(30) Foreign Application Priority Data

Sep. 30, 2019 (JP) .............................. JP2019-180366

(51) Int. Cl.
*H04N 5/232* (2006.01)
(52) U.S. Cl.
CPC ..... *H04N 5/23222* (2013.01); *H04N 5/23219* (2013.01); *H04N 5/23296* (2013.01); *H04N 5/23299* (2018.08)
(58) Field of Classification Search
CPC ....................... H04N 5/23222; H04N 5/23219
See application file for complete search history.

(56) References Cited

U.S. PATENT DOCUMENTS

2009/0322896 A1\*  12/2009  Yoshizumi ........... H04N 1/2112
348/222.1
2021/0303968 A1\*  9/2021  Donsbach .......... H04N 5/23216

FOREIGN PATENT DOCUMENTS

JP         2011-30164 A      2/2011

\* cited by examiner

*Primary Examiner* — Christopher K Peterson
(74) *Attorney, Agent, or Firm* — Canon U.S.A., Inc. I.P. Division

(57) ABSTRACT

An image capturing apparatus includes an image pickup device configured to output image data and at least one processor programmed to perform operations of a past history storage unit configured to store imaging information about each object, the imaging information including framing information about past imaging of each object, an acquisition unit configured to acquire object information based on the image data and a determination unit configured to determine a framing in execution of an imaging operation. The determination unit determines the framing in execution of the imaging operation according to past imaging information stored in the past history storage unit and the object information.

18 Claims, 15 Drawing Sheets

FIG.7

| FRAMING PATTERN | TARGET FACE SIZE (%) | | |
| --- | --- | --- | --- |
| | MINIMUM VALUE | MAXIMUM VALUE | MEDIAN |
| SMALL | 5 | 10 | 7.5 |
| MEDIUM | 10 | 15 | 12.5 |
| LARGE | 15 | 20 | 17.5 |

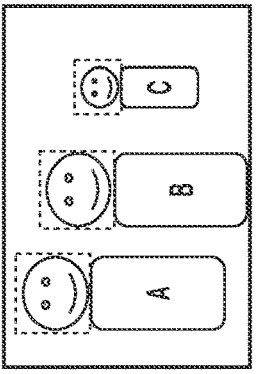
FIG.8A
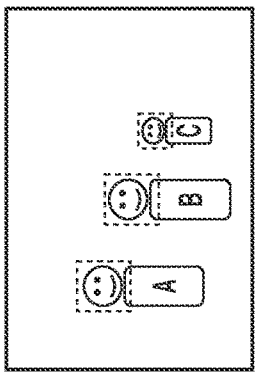
FIG.8B
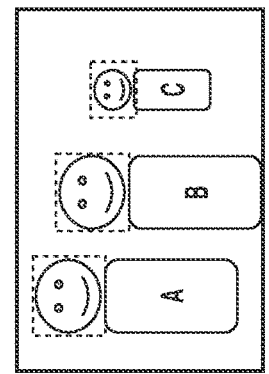
FIG.8C
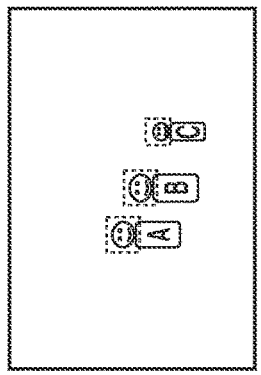
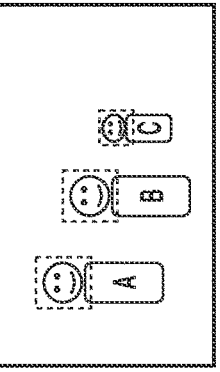

FIG.9A

FACE id INFORMATION - RELATED IMAGE PICKUP DATA TABLE

| RELATED IMAGE PICKUP DATA NAME | OBJECT INFORMATION [n] | | | |
|---|---|---|---|---|
| | FACE id INFORMATION | FACE SIZE INFORMATION | FACE POSITION INFORMATION | ORIENTATION |
| IMG_1000 | A | SMALL | (400,230) | FRONT |
| | B | SMALL | (500,250) | FRONT |
| | C | SMALL | (600,350) | LEFT |
| IMG_0999 | A | LARGE | (200,100) | FRONT |
| | B | LARGE | (500,200) | RIGHT |
| | C | MEDIUM | (800,250) | LEFT |
| IMG_0998 | A | MEDIUM | (250,200) | FRONT |
| | B | MEDIUM | (500,250) | FRONT |
| | C | SMALL | (600,300) | LEFT |
| ⋮ | ⋮ | ⋮ | ⋮ | ⋮ |

FIG.9B

FACE id INFORMATION - FACE RECOGNITION FEATURE INFORMATION TABLE

| FACE id INFORMATION | FACE RECOGNITION FEATURE INFORMATION |
|---|---|
| A | INFORMATION ON POSITIONAL RELATIONSHIPS AMONG NOSE, EYES, AND MOUTH OF A |
| B | INFORMATION ON POSITIONAL RELATIONSHIPS AMONG NOSE, EYES, AND MOUTH OF B |
| C | INFORMATION ON POSITIONAL RELATIONSHIPS AMONG NOSE, EYES, AND MOUTH OF C |

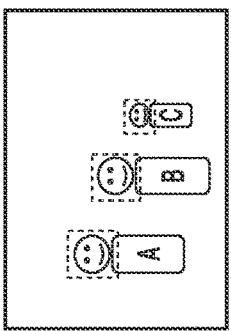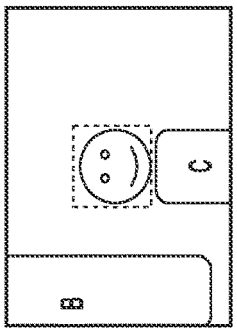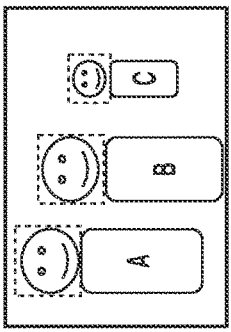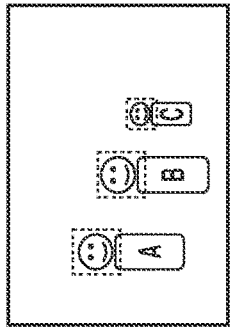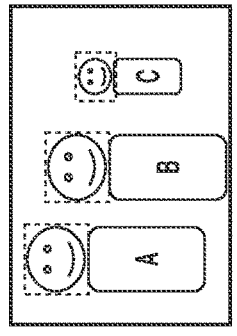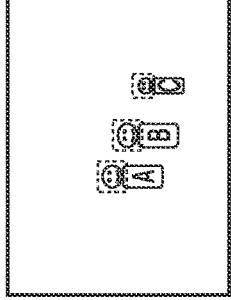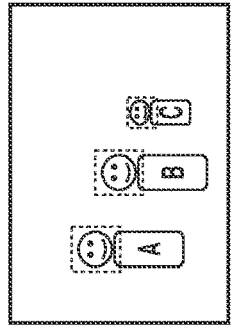

FIG.11A

FACE id INFORMATION - RELATED IMAGE PICKUP DATA TABLE

| RELATED IMAGE PICKUP DATA NAME | OBJECT INFORMATION [n] | | | |
|---|---|---|---|---|
| | FACE id INFORMATION | FACE SIZE INFORMATION | FACE POSITION INFORMATION | ORIENTATION |
| IMG_1000 | A | SMALL | (400,230) | FRONT |
| | B | SMALL | (500,250) | FRONT |
| | | | | |
| IMG_0999 | A | LARGE | (200,100) | FRONT |
| | B | LARGE | (500,200) | RIGHT |
| | C | MEDIUM | (800,250) | LEFT |
| IMG_0998 | A | MEDIUM | (250,200) | FRONT |
| | | | | |
| ⋮ | ⋮ | ⋮ | ⋮ | ⋮ |

FIG.11B

BODY id INFORMATION - RELATED IMAGE PICKUP DATA TABLE

| RELATED IMAGE PICKUP DATA NAME | OBJECT INFORMATION [n] | | | | BODY INFORMATION [n] | | | |
|---|---|---|---|---|---|---|---|---|
| | FACE id INFORMATION | FACE SIZE INFORMATION | FACE POSITION INFORMATION | ORIENTATION | BODY id INFORMATION | BODY SIZE INFORMATION | BODY POSITION INFORMATION | ORIENTATION |
| IMG_1000 | A | SMALL | (400,230) | FRONT | a | SMALL | (50,100) | FRONT |
| | B | SMALL | (500,250) | FRONT | b | SMALL | (100,200) | FRONT |
| | C | SMALL | (600,350) | LEFT | | | | |
| IMG_0999 | A | LARGE | (200,100) | FRONT | b | SMALL | (100,200) | FRONT |
| | B | LARGE | (500,200) | RIGHT | | | | |
| | C | MEDIUM | (800,250) | LEFT | | | | |
| IMG_0998 | A | MEDIUM | (250,200) | FRONT | a | MEDIUM | (50,10) | FRONT |
| | B | MEDIUM | (500,250) | FRONT | b | MEDIUM | (100,200) | FRONT |
| | C | SMALL | (600,300) | LEFT | c | SMALL | (300,100) | LEFT |
| .... | .... | .... | .... | .... | .... | .... | .... | .... |

FIG.14
BODY id INFORMATION - RELATED IMAGE PICKUP DATA TABLE

| RELATED IMAGE PICKUP DATA NAME | OBJECT INFORMATION [n] | | | | BODY INFORMATION [n] | | | | LOCATION ID |
|---|---|---|---|---|---|---|---|---|---|
| | FACE id INFORMATION | FACE SIZE INFORMATION | FACE POSITION INFORMATION | ORIENTATION | BODY id INFORMATION | BODY SIZE INFORMATION | BODY POSITION INFORMATION | ORIENTATION | |
| IMG_1000 | A | SMALL | (400,230) | FRONT | a | SMALL | (50,100) | FRONT | 2 |
| | B | SMALL | (500,250) | FRONT | b | SMALL | (100,200) | FRONT | |
| | C | SMALL | (600,350) | LEFT | | | | | |
| IMG_0999 | A | LARGE | (200,100) | FRONT | b | SMALL | (100,200) | FRONT | 1 |
| | B | LARGE | (500,200) | RIGHT | | | | | |
| | C | MEDIUM | (800,250) | LEFT | | | | | |
| IMG_0998 | A | MEDIUM | (250,200) | FRONT | a | MEDIUM | (50,10) | FRONT | 1 |
| | B | MEDIUM | (500,250) | FRONT | b | MEDIUM | (100,200) | FRONT | |
| | C | SMALL | (600,300) | LEFT | c | SMALL | (300,100) | LEFT | |
| .... | .... | .... | .... | .... | .... | .... | .... | .... | .... |

IMAGE CAPTURING APPARATUS, METHOD OF CONTROLLING IMAGE CAPTURING APPARATUS, AND STORAGE MEDIUM

BACKGROUND

Field of the Disclosure

The present disclosure generally relates to an automatic image capturing technology in an image capturing apparatus.

Description of the Related Art

In recent years, an automatic image capturing unit, which captures images regularly and continuously without a user issuing an image capturing instruction, has been developed and put into practical use.

For such an automatic image capturing unit, it is desirable that all the persons to be captured are uniformly captured without a deviation to a specific person, and recorded as image data. For example, Japanese Patent Application Laid-Open No. 2011-30164 discusses an adjustment technique that uniformly captures individual persons. In Japanese Patent Laid-Open No. 2011-30164, the adjustment technique is configured to detect objects from acquired image data, execute personal identification processing for each of the detected objects, and acquire personal identification information. Then, the adjustment technique holds personal record count information indicating the count number of recordings of image data for each object as an individual identified by the personal identification information. Then, the adjustment technique determines whether to make a transition to a state where another object should be detected, based on the personal record count.

While it is possible to reduce a deviation in the number of images of taken objects so as not to capture the same object, only image data with a similar angle of field can be captured for an identical object.

SUMMARY

The present disclosure achieves more uniform capturing of individual objects with various framings, compared to the prior art.

According to an aspect of the present disclosure, an image capturing apparatus includes an image pickup device configured to output image data and at least one processor programmed to perform operations of a past history storage unit configured to store imaging information about each object, the imaging information including framing information about past imaging of each object, an acquisition unit configured to acquire object information based on the image data, and a determination unit configured to determine a framing in execution of an imaging operation. The determination unit determines the framing in execution of the imaging operation according to past imaging information stored in the past history storage unit and the object information.

Further features of the present disclosure will become apparent from the following description of exemplary embodiments with reference to the attached drawings.

BRIEF DESCRIPTION OF THE DRAWINGS

FIG. 7 is a table describing framing patterns according to the first exemplary embodiment.

FIGS. 8A to 8C are diagrams describing an example of framing setting by the first pre-image capturing framing adjustment according to the first exemplary embodiment.

FIGS. 9A and 9B are tables describing an example of information stored in a past history storage unit according to the first exemplary embodiment.

FIGS. 10A to 10D are diagrams describing an example of framing setting by the second pre-image capturing framing adjustment according to the first exemplary embodiment.

FIGS. 11A and 11B are tables describing a second example of information stored in the past history storage unit according to the first exemplary embodiment.

FIG. 14 is a table describing an example of information stored in the past history storage unit according to the second exemplary embodiment.

DESCRIPTION OF THE EMBODIMENTS

Preferred embodiments of the present disclosure will now be described in detail in accordance with the accompanying drawings.

<Configuration of Image Capturing Unit>

Figure 1:
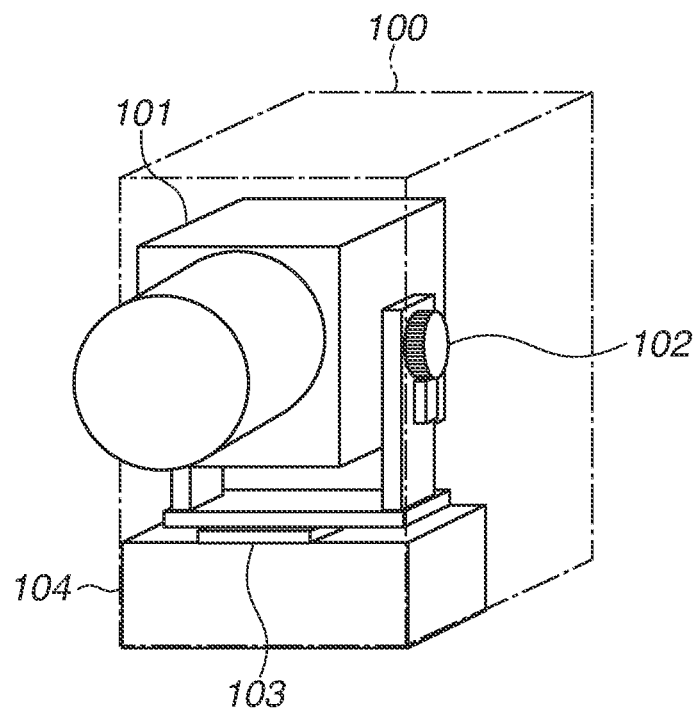
FIG. 1 is a schematic diagram illustrating an appearance of a image capturing unit which is an exemplary embodiment of an image capturing apparatus according to the present disclosure.

FIG. 1 is a schematic diagram illustrating an appearance of an image capturing unit which is an exemplary embodiment of an image capturing apparatus of the present disclosure. An image capturing unit 100 in FIG. 1 includes a power switch and operation members capable of operating the image capturing unit 100. A lens barrel 101, which integrally includes an imaging lens group and an imaging sensor as parts of an imaging optical system that captures an object image, is movably mounted on a control box 104 of the image capturing unit 100. Specifically, the lens barrel 101 is mounted on the control box 104 via a tilt rotation unit 102 and a pan rotation unit 103, which are mechanisms that can be rotationally driven with respect to the control box 104.

Figure 2:
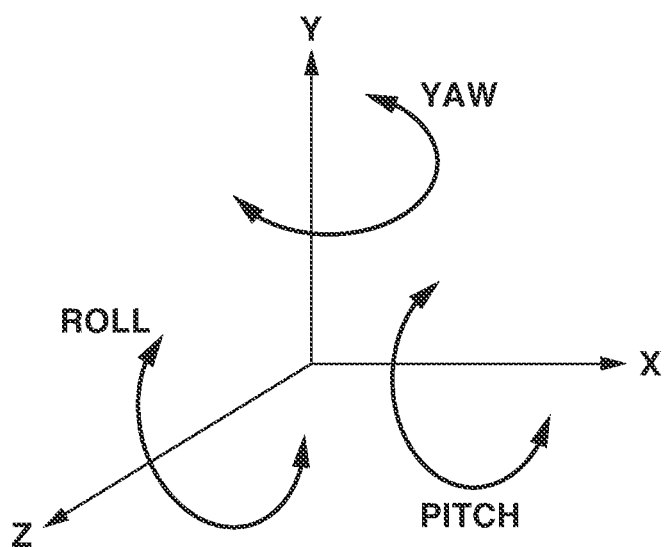
FIG. 2 is an illustrative diagram for defining rotation axes according to a first exemplary embodiment.

The tilt rotation unit 102 includes a motor drive mechanism capable of rotationally driving the lens barrel 101 in the pitch direction illustrated in FIG. 2. The pan rotation unit 103 includes a motor drive mechanism capable of rotationally driving the lens barrel 101 in the yaw direction illustrated in FIG. 2. Thus, the image capturing unit 100 has the mechanisms to rotationally drive the lens barrel 101 in the two axial directions. Each axis in FIG. 2 is defined with respect to the position of the control box 104.

Figure 3:
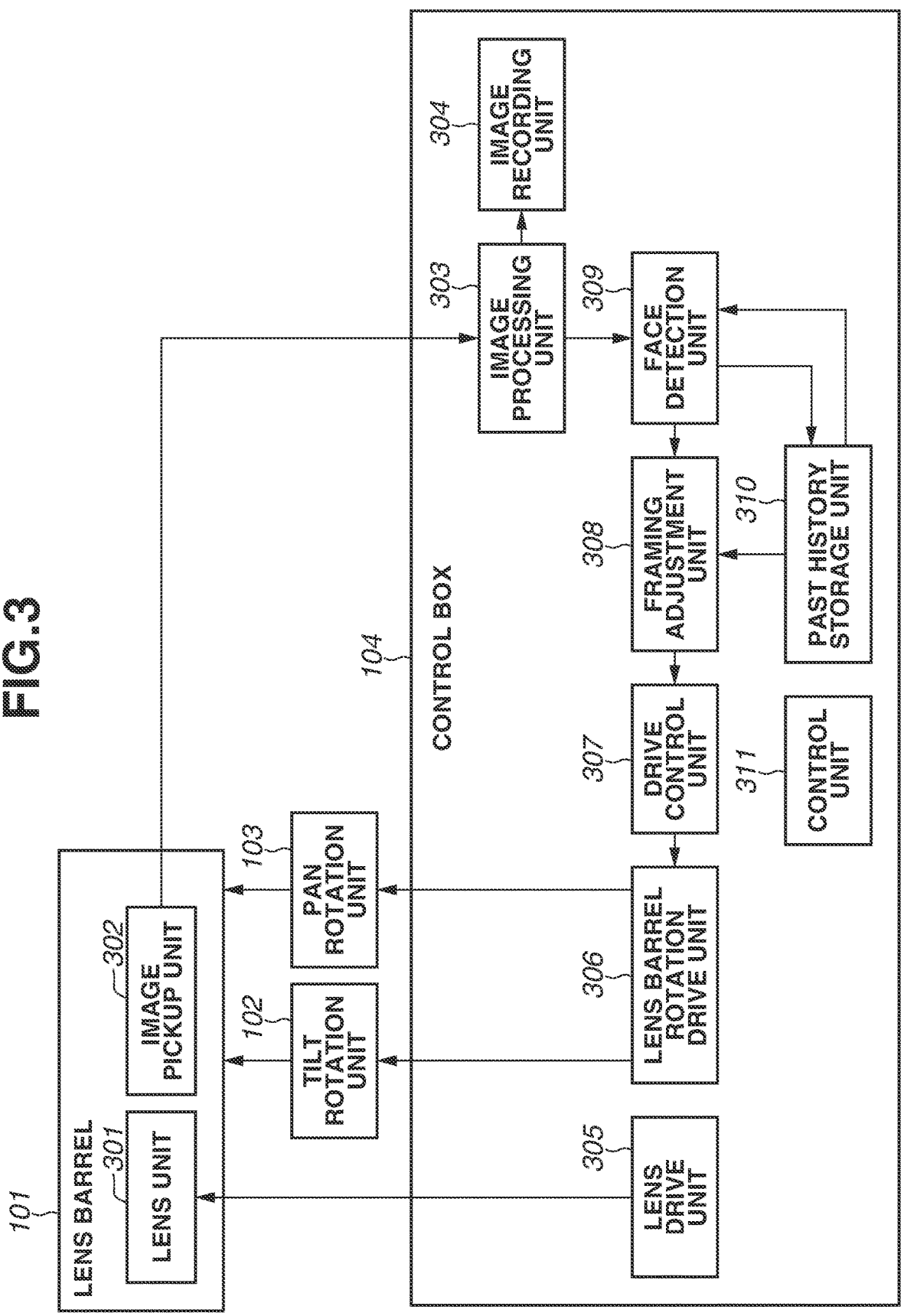
FIG. 3 is a block diagram illustrating a configuration of an image capturing apparatus according to the first exemplary embodiment.

FIG. 3 is a block diagram illustrating an overall configuration of the image capturing unit 100 according to a first exemplary embodiment. The lens barrel 101 includes a lens unit 301 and an image pickup device 302, and is rotationally drive-controlled in the tilt and pan directions by the tilt rotation unit 102 and the pan rotation unit 103, respectively. The lens unit 301 includes a zoom lens for magnification and a focus lens for focus adjustment, and is drive-controlled by a lens drive unit 305.

In the image pickup device 302, the imaging sensor receives light incident from the respective lens groups. The image pickup device 302 then outputs information about an electric charge corresponding to the amount of the light to an image processing unit 303, as image pickup data.

The tilt rotation unit 102 includes a motor drive mechanism that can rotate in the pitch direction in FIG. 2 described above. The pan rotation unit 103 includes a motor drive mechanism that can rotate in the yaw direction in FIG. 2 described above. The tilt rotation unit 102 and the pan rotation unit 103 rotationally drive the lens barrel 101 according to a drive instruction input from a lens barrel rotation drive unit 306.

The control box 104 includes the image processing unit 303, the lens drive unit 305, the lens barrel rotation drive unit 306, a drive control unit 307, a framing adjustment unit 308, a face detection unit 309, a past history storage unit 310, and a control unit 311. Each of the units will be described in detail below.

The image processing unit 303 applies image processing such as distortion correction, white balance adjustment, and color interpolation processing to image pickup data output from the image pickup device 302, and outputs the processed image data (still image) to an image recording unit 304 and the face detection unit 309. Even in a case where the image data is moving image data, the description will be identical. While the following description will therefore be focused on image data, it is not limited to such image data, and can be also applied to moving image data.

The image recording unit 304 converts the image data output from the image processing unit 303 into a recording format such as JPEG format, and records the converted image data in a recording medium such as a non-volatile memory not illustrated. The recording timing follows an instruction from the framing adjustment unit 308 described below.

The lens drive unit 305 includes a motor and a drive unit that drive the zoom lens and the focus lens in the lens unit 301. Each of the lenses is driven based on a target location and a driving speed input from the drive control unit 307.

The lens barrel rotation drive unit 306 outputs a driving instruction to the tilt rotation unit 102 and the pan rotation unit 103 based on the target location and the driving speed input from the drive control unit 307, and drives the lens barrel 101 in the tilt and pan directions.

The drive control unit 307 determines the target location and the driving speed for driving the lenses and rotationally driving the lens barrel, based on zoom magnification information and pan and tilt rotation angle information input from the framing adjustment unit 308. The drive control unit 307 outputs determined parameters (pan control amount and tilt control amount) to the lens drive unit 305 and the lens barrel rotation drive unit 306.

The face detection unit 309 receives from the image processing unit 303 the image data on which the image processing has been executed. The face detection unit 309 detects a face area based on the input data. Then, the face detection unit 309 outputs face position information indicating the center coordinate position of a face in the image data, face size information indicating the size of the face area in the image data, face identification feature information (positional relationships among feature points such as eyes, nose, and mouth) for identifying the face of each object and face orientation information. Further, the face detection unit 309 allocates a face id information specific to each object, using the corresponding face identification feature information, and the face detection unit 309 outputs the face id information. The face id information and the face position information are transmitted to the framing adjustment unit 308. Further, the face id information, the face size information, the face identification feature information, and the face orientation information are transmitted to the past history storage unit 310.

The framing adjustment unit 308 receives the face position information, the face id information, and the face size information of the image data from the face detection unit 309. Further, as will be described below, the framing adjustment unit 308 receives face id information and face size information of the image data recorded in the past from the past history storage unit 310. The framing adjustment unit 308 determines whether there is a deviation in the persons and/or framing patterns on the image data, using the received information. If the framing adjustment unit 308 determines that there is a deviation, the framing adjustment unit 308 outputs zoom magnification information and pan and tilt rotation angle information for adjusting the framing to the drive control unit 307.

The operation that executes a framing adjustment by controlling the drive unit so that the faces of all of the objects to be captured are within individual angles of field is called a first pre-image capturing framing adjustment, hereinafter. In addition, the operation that checks whether there is a deviation in the face size information about each of the captured objects and/or in the number of captured images of each of the objects from the face id information and the face size information about each of the objects acquired in the past and that executes a framing adjustment to reduce the deviation is called a second pre-image capturing framing adjustment. In the description common to the first pre-image capturing framing adjustment and the second pre-image capturing framing adjustment, they are simply called a pre-image capturing framing adjustment. At the first pre-image capturing framing adjustment, zoom magnification information (including zoom control amount information) and pan and tilt rotation angle information (including pan control amount and tilt control amount information) are output to the drive control unit 307 so that the framing is adjusted to bring the faces of all the objects to be captured within individual angles of field. Recording the image data after executing such a framing adjustment enables the automatic tracking and framing adjustment of even a moving object, so that the image capturing operation can be performed without missing the object. Further, the second pre-image capturing framing adjustment involves storing face id information and face size information about each object acquired in the past. Then, the framing adjustment unit 308 examines whether there is a deviation in the face size information and/or in the number of images captured on each object. If the framing adjustment unit 308 determines that there is a deviation in the face size information and/or in the number of images, the framing adjustment unit 308 outputs zoom magnification information and pan and tilt rotation angle information to the drive control unit 307 to reduce the deviation, and executes a framing adjustment.

The framing adjustment unit 308 uses face id information and face size information acquired in the past from the past history storage unit 310 to determine a deviation in the face size and in the number of images. The past history storage unit 310 stores face identification feature, face id, face size, and face orientation information about each object included in image data received from the face detection unit 309, in a recording medium such as a non-volatile memory not illustrated. Further, the past history storage unit 310 transmits the face identification feature information and the face id information about the previously captured object stored in the past history storage unit 310 to the face detection unit 309. By using the information, the face detection unit 309 determines whether a new object is captured on the current image data. If a new object image is captured, the face detection unit 309 allocates and controls a new id as the face id information. The face id information and the face size information (one of the pieces of framing information) acquired in the past stored in the past history storage unit 310 are transmitted to the framing adjustment unit 308 as imaging information. The framing adjustment unit 308 checks whether there is a deviation in the received face id information and face size information to determine whether to execute a framing adjustment.

The control unit 311 controls the functional blocks described above. The details will be described below.

Figure 4:
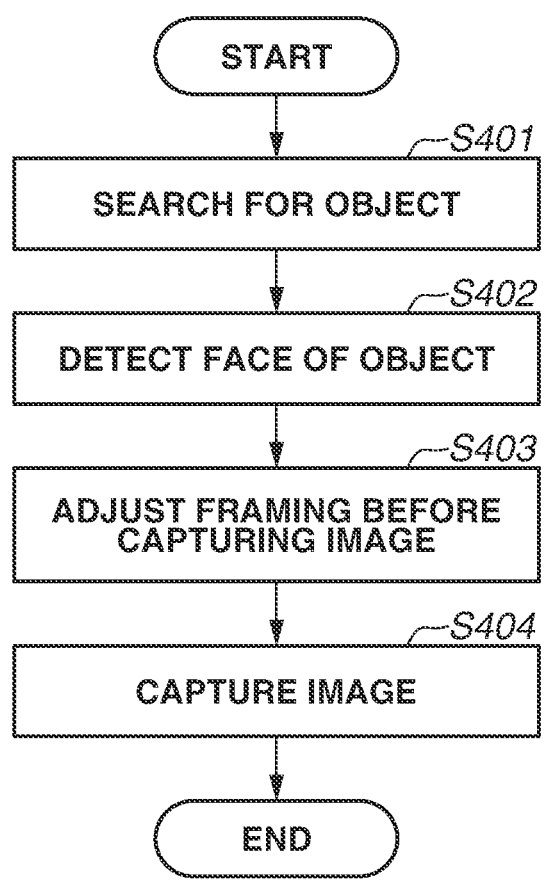
FIG. 4 is a flowchart illustrating automatic image capturing processing according to the first exemplary embodiment.

Next, an overall flowchart of the automatic image capturing by the image capturing unit 100 will be described using FIG. 4. FIG. 4 illustrates a flowchart where the image capturing apparatus 100 automatically searches for and detects surrounding objects, and records image data at an appropriate timing.

In FIG. 4, in step S401, the image capturing apparatus 100 searches for an object to detect a direction where the object exists within the range in which the image capturing apparatus 100 is rotationally movable. The object search involves dividing the movable range of the image capturing apparatus 100 into a plurality of areas, finding the area where the object exists by the face detection unit 309 executing face detection processing on each divided area, and determining to acquire image pickup data from the area. The area division method may be determined, for example, from a movable range where all the areas can be captured and/or where an overlap does not occur.

The control unit 311 controls each divided area. The control unit 311 holds pan and tilt rotation angle information designated and the number of detected faces of the object for each divided area. If the control unit 311 determines that the object exists in a plurality of areas, the control unit 311 directs the image capturing direction to the division area where the number of detected faces is the largest in a divided time, makes a transition to a next area after the image capturing is completed, and repeats the capturing processing in order, for example.

In step S402, the face of the object is detected on the image pickup data in the direction determined in step S401. The face detection of the object is executed by the face detection unit 309.

In step S403, the pre-image capturing framing adjustment is executed using the face information detected by the face detection unit 309. Specifically, a pan and tilt rotation angle control and a zoom control of the image capturing apparatus 100 are executed to achieve a framing suitable for the detected object. Details of the pre-image capturing framing adjustment will be described below with reference to FIGS. 5 and 6.

Finally, when the framing adjustment is completed in step S403, the control unit 311 issues an instruction to record the image data to which the framing adjustment has been executed, in the past history storage unit 310 at an appropriate timing (image capturing) in step S404. An example of the appropriate timing may be a timing when an object smiles, for example. Recording the image data at such a timing enables the automatic image capturing that will be satisfying to the user. In the case, the control unit 311 receives the face data from the face detection unit 309 to detect the smile to determine the expression.

Next, the flowcharts of the pre-image capturing framing adjustment will be described with reference to FIGS. 5 and 6.

The flowchart of the first pre-image capturing framing adjustment will be described with reference to steps S501 to S508 in FIG. 5. Then, the flowchart of the second pre-image capturing framing adjustment will be described with reference to FIG. 6.

In the first pre-image capturing framing adjustment, the image capturing apparatus 100 automatically tracks an object by following the motion of the object and adjusts the framing to capture the object without missing the object.

The first pre-image capturing framing adjustment involves holding predetermined framing patterns, setting zoom magnification information and pan and tilt rotation angle information to set a predetermined framing, and capturing an image.

FIG. 7 is a table describing a relationship with target face sizes for each framing pattern according to the first exemplary embodiment of the present disclosure.

In the first exemplary embodiment, there are three framing patterns. The face size changes according to the framing patterns when an object is captured in an angle of field.

A framing pattern is sequentially changed for each imaging. Specifically, after imaging is executed with a framing pattern "medium", the framing pattern switches to "large", and after imaging is executed with the framing pattern "large", the framing pattern changes back to "small".

Zoom magnification information and pan and tilt rotation angle information to follow a target face size in the current framing pattern are provided while the currently captured face size is observed.

The target face size represents the target pixel value of the ratio of the face size of an object to the screen (face size/horizontal resolution×100).

For example, in the case that a horizontal resolution is 960 pixels with the "small" framing pattern, the target face size is 5% to 10% (the median is 7.5%), or 48 pixels to 96 pixels (the median is 72 pixels).

According to the first exemplary embodiment, a zoom position is calculated so that the face size of the target object existing at the front falls within the range of a current target face size, and the rotation angle is adjusted so that the target object is located at the center of the screen.

Figure 5:
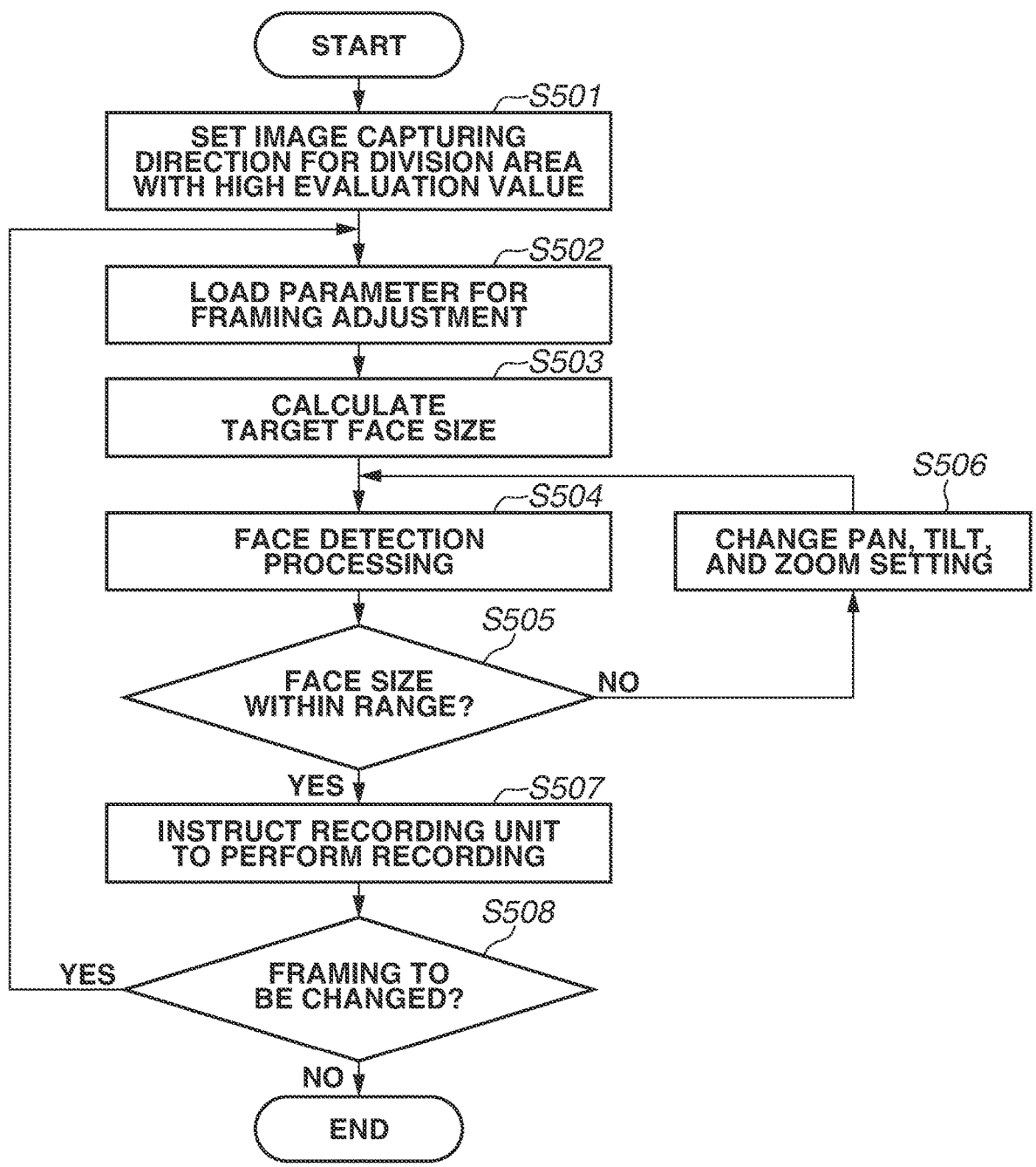
FIG. 5 is a flowchart illustrating a first pre-image capturing framing adjustment according to the first exemplary embodiment.

In the first pre-image capturing framing adjustment, in step S501 in FIG. 5, pan and tilt rotation angle information is set so that the area where the object exists is captured using the result of the object search. Specifically, the control unit 311 sets the pan and tilt rotation angle information about the area in the drive control unit 307 to bring the target object within the angle of field.

In step S502, the framing adjustment unit 308 receives face position information, and checks whether the face position information is sufficient for the number of persons corresponding to the area detected by the imaging search in order for the image capturing unit 100 to capture all the persons detected during the object search as the imaging targets.

Next, in step S502, the framing adjustment unit 308 loads a parameter for the framing adjustment. The framing pattern "medium" is selected here. Next, the framing adjustment unit 308 calculates a target face size corresponding to the selected pattern in step S503.

In step S504, received image pickup data is transmitted via the image pickup device 302 to the image processing unit 303, where the image pickup data is converted to an image data. The image data is transmitted to the face detection unit 309, which performs face detection processing on the image data input to the face detection unit 309. Face information, which is the result of the face detection processing, is transmitted to the framing adjustment unit 308.

In step S505, the framing adjustment unit 308 determines whether the face size is within the range of the target face size, based on the received face information.

If the framing adjustment unit 308 determines that the face size is within the range of the target face size, the control unit 311 sends an instruction to the image recording unit 304 in step S507, to store the image data.

If the framing adjustment unit 308 determines that the face size is not within the range of the target face size, the framing adjustment unit 308 sends an instruction to the drive control unit 307 to change the zoom magnification information and the pan and tilt rotation angle information in step S506. The drive control unit 307 brings the face size into the range of the target face size and to locate the face position of the object existing at the front at the center of the image. As for the zoom setting, if the face size is larger than the target face size, the zoom is set so that the face size becomes smaller. Conversely, if the face size is smaller than the target face size, the zoom is set so that the face size becomes larger, and such zoom settings are repeated. At the time, if the zoom setting reaches the limit for the zoom setting, the zoom setting is stopped, and the object is captured with the limit value of the zoom setting.

Finally, the framing adjustment unit 308 determines in step S508 whether capturing has been performed with all the framing patterns. If the framing adjustment unit 308 determines that there remains a framing pattern that has not been used for capturing, the processing proceeds to step S502, and the processing is repeated until the completion of capturing with all framing patterns.

FIGS. 8A to 8C illustrate an example of executing framing adjustments of image pickup data before a framing adjustment, to "medium", to "large", and to "small". A case will be described in which there are objects A, B, and C to be captured and in which the objects are captured with the framing adjustments. In FIG. 8A, the object B exists at the front, and a framing adjustment is executed on the object B using the face size. FIG. 8A illustrates an example of determining that the face size of the object B is smaller than the target face size in the framing "medium" and of then setting zoom magnification information and pan and tilt rotation angle information so that the object B is enlarged. In FIG. 8A, after the face size of the object B reaches the target range, the object B is captured.

Similarly, FIG. 8B illustrates an example of determining that the face size of the object B is smaller than the target face size in the framing "large" and of then setting zoom magnification information and pan and tilt rotation angle information so that the object B is enlarged. In FIG. 8B, after the face size of the object B reaches the target range, the object B is captured.

Finally, FIG. 8C illustrates an example of determining that the face size of the object B is larger than the target face size in the framing "small" and of then setting zoom magnification information and pan and tilt rotation angle information so that the object B is reduced. In FIG. 8C, after the face size of the object B reaches the target range, the object B is captured.

Executing the first pre-image capturing framing adjustment in the above manner enables image data to be acquired with various framings.

In step S507, an instruction to record in the image recording unit may be given only once or given a plurality of times. The control unit 311 determines whether there is an important framing (important scene) to be recorded a plurality of times. Examples of determining that there is an important framing include a case where the expression in the face information acquired from the face detection unit 309 is a smile and a case where a plurality of images is captured based on the detection of an act of an object. Executing such controls enables the acquisition of image data that will be satisfying to the user. Further, a determination as to whether there is an important framing may be executed through learning frequencies at which individual framing patterns of image data recorded by a user in the past by manual image capturing appear and/or learning the expressions of an object in the recorded image data. Further, objects, imaging scenes, and/or time the user likes may be learned from image data which has been recorded in the past, in order for the control unit 31 to determine whether there is an important framing. Further, the user may select the important framing by using a method prepared in advance through which the user can select an important framing via a user setting unit such as a touch panel (not illustrated).

If an object exists in a plurality of areas, a framing adjustment is repeated after the divided area is changed in step S501 and the image capturing unit 100 captures the image.

On the other hand, when only the first pre-image capturing framing adjustment is made as described above, the zoom position is calculated so that the face size of the target object existing at the front falls within the range of the target face size. If an object exists at the backward position, which appears with a smaller face size than that of the target object at the front, image data in which the face size of the backward object is "large" may not be acquired. That is the case with the example in FIG. 8B. In FIG. 8B, the framing adjustment to "large" is executed. In the case, the zoom position is calculated so that the face size of the object B at the front is within the range of the target face size in the framing adjustment to "large". Therefore there arises an issue in that the face size "large" image of the object C with a face size smaller than the target object at the front cannot be acquired as the object C exists at the backward position.

In order to address such an issue, the present exemplary embodiment executes the second pre-image capturing framing adjustment. The second pre-image capturing framing adjustment involves recording image data captured after the first pre-image capturing framing adjustment, and additionally recording the number of images and captured face sizes of individual objects as a past imaging history. Further the second pre-image capturing framing adjustment includes using the recorded image data and past imaging history to examine whether there is a deviation in the number of images of the objects and whether there is a deviation in the face size information about the objects, and reducing the deviation if a deviation occurs. The second pre-image capturing framing adjustment will be detailed with reference to the flowchart in FIG. 6.

Figure 6:
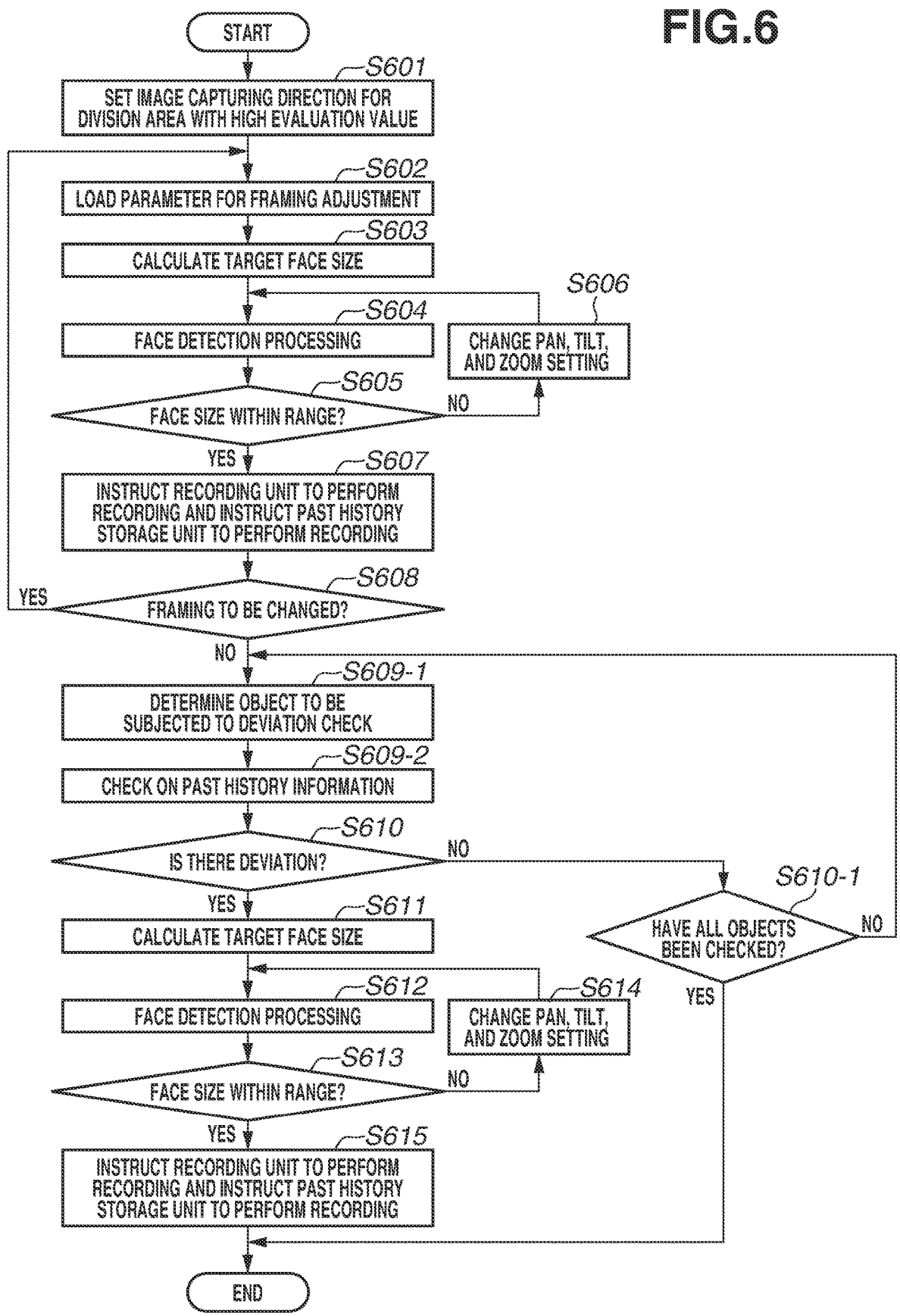
FIG. 6 is a flowchart illustrating a second pre-image capturing framing adjustment according to the first exemplary embodiment.

The processing in steps S601 through S606 and S608 in FIG. 6 is identical with that in steps S501 through S506 and S508 of the first pre-image capturing framing adjustment flowchart in FIG. 5, the description of which will be omitted. All steps after the first pre-image capturing framing adjustment is completed will be described below. Although the first pre-image capturing framing adjustment records image data after the framing adjustment in step S507, the second pre-image capturing framing adjustment records the past history information in addition to the recording of the image data in step S607. Specifically, image pickup data acquired by capturing an object is output from the image pickup device 302, and the image data is further output from the image processing unit 303. The image data is recorded in the image recording unit 304 by an instruction from the control unit 311. Further, the control unit 311 inputs the image pickup data, which is the source of the image data, into the face detection unit 309, and issues an instruction to store face information (face id information, face size information, and face identification feature information), which is the face detection result, in the past history storage unit 310 (S607).

FIGS. 9A and 9B illustrate an example of the face information stored in the past history storage unit 310 in step S607. FIG. 9A illustrates an example of a face id information-related image pickup data table in which the face id information, the face size information, the face position information, and the face orientation information are recorded, all of which are output by the face detection unit 309 for each of the image data names last stored in the image recording unit 304. The face detection unit 309 assigns a unique alphabet as face id information so that each object can be distinguished.

FIG. 9A illustrates an example in which the face id information about three persons of objects A, B, and C is registered. The face id information is also associated with the face size information. In FIG. 9A, as the face size information, the results evaluated in three patterns of "large", "medium", and "small" are stored. The face detection unit 309 evaluates face size information in an identical manner to the first pre-image capturing framing adjustment processing.

In FIG. 9B, the past history storage unit 310 stores face id information-face identification feature information table information that associates the face id information with the face identification feature information. The reason why the face id information is stored in association with the face identification feature information is that each of the pieces of face id information is uniquely assigned to one captured object for a determination of whether the captured object has been registered or not by using the face identification feature information. The face identification feature information is output from the face detection unit 309, and recorded in the past history storage unit 310.

As illustrated in FIG. 9A, the face size information about the objects A and B in the acquired past history includes face size information including "large", "medium", and "small". On the other hand, the face size information about the object C includes "medium" and "small" sizes but does not include "large" face size information, which is not acquired.

The second pre-image capturing framing adjustment processing reduces such a deviation in the framing for an object. Specifically, in step S609-1, the framing adjustment unit 308 receives past history from the past history storage unit 310, determines a target object, checks the past history of the determined target object (S609-2), and checks whether there is a deviation in the face size information about the object (S610). In the example of FIGS. 9A and 9B, the framing adjustment unit 308 checks whether there is a deviation in the object A. Then, the framing adjustment unit 308 refers to the past history information regarding the object A to check whether there is a deviation in the face size information. The framing adjustment unit 308 counts the pieces of the "large" face size information, the pieces of the "medium" face size information, and the pieces of the "small" face size information in the deviation determination, and determines that there is a deviation if there is an extremely small count. Similarly, the framing adjustment unit 308 checks whether there is a deviation in the face size information regarding the objects B and C as well. In the example of FIGS. 9A and 9B, the framing adjustment unit 308 detects a deviation that there is no "large" size in the face size information about the object C.

In step S610, if the framing adjustment unit 308 determines that there is a deviation, the framing adjustment unit 308 executes framing adjustment processing to reduce the deviation. Specifically, the framing adjustment unit 308 starts a framing adjustment for acquiring a "large" face size of the object C to reduce the deviation in the face size information about the object C.

If the framing adjustment unit 308 determines that there are no deviations in the face size of the currently checked target object, the framing adjustment unit 308 continuously determines whether there is a deviation in the other objects to check all the objects for a deviation (S610-1).

If the framing adjustment unit 308 determines that there is a deviation in the face size of an object, the framing adjustment unit 308 calculates a target face size for eliminating the deviation. Specifically, in step S611, a target face size in the "large" framing is calculated. Then, the framing adjustment unit 308 acquires the face size of the current object C in step S612, checks whether the face size is within the range (S613), and changes settings for the zoom magnification information and the pan and tilt rotation angle information so that the face size falls within the range (S614).

If the framing adjustment unit 308 determines that the face size of the object C is within the range, the framing adjustment unit 308 records image data in the image recording unit 304 in step S615, similarly to the first pre-image capturing framing adjustment.

FIGS. 10A to 10D illustrate an example of framing adjustments executed by the second pre-image capturing framing adjustment processing. FIGS. 10A, 10B, and 10C illustrate a state in which framing adjustments are executed in an identical manner to the first pre-image capturing framing adjustment. After each of the framing adjustments is executed, each of the pieces of image data is recorded in the image recording unit 304. In addition, the second pre-image capturing framing adjustment processing involves referring to the past history information about the recorded image data, determining that there are no "large" framing patterns in the face size of the object C, adjusting the framing so that the face size of the object C becomes "large" to acquire the result of FIG. 10D, and recording the image data in the image recording unit 304.

The above is an description of the method of checking whether there is a deviation in captured image data and the face size of an captured object using the past imaging history of the captured face size. If there is a deviation in the face size of a target object to be captured, adopting the method enables the face size of the target object to be adjusted through the change of the zoom magnification information and the pan and tilt rotation angle information and enables the target object to be captured uniformly in the framing patterns including the face size.

The first exemplary embodiment is an example in which there is a deviation in the face size of an object. Alternatively, a framing adjustment may be executed when a deviation that has occurred in the number of images of an object is detected using past history information. That is, even if a deviation occurs in the number of captured images of an object due to movement of the object, a framing adjustment to capture the object with a smaller number of images on a priority basis is achieved by checking the past history information in the second pre-image capturing framing adjustment. FIG. 11A illustrates an example in which not all of the objects are captured in one piece of image pickup data due to movement of at least one of the objects. The deviations in the number of captured images are reduced by executing framing adjustments by the method described in the first exemplary embodiment, which acquires the past information, detects an object with a smaller number of images, and can capture the object more. FIG. 11A is an example in which a deviation in the number of captured images occurs due to movement of an object. If a framing adjustment that intentionally changes a target object to be captured is executed, a past history with a similar tendency to the above could be acquired. Even if such a framing adjustment is executed, the framing adjustment through the method enables a deviation in the number of captured images to be reduced.

Further, the method can reduce the deviation in a case of a deviation in face orientation information or in a case of detecting a deviation that is a face position far away from the center of the image. Besides, the method is applicable to a case of reducing a deviation with expression information stored as a past history for checking whether an object in the images is mostly expressionless.

Further, the face detection unit may be replaced with a general-purpose detection unit that detects an animal such as a pet whereas the method described in the first exemplary embodiment reduces a deviation in capturing a person as an object. In the case, in a similar way to the method that reduces a deviation in face size in the first exemplary embodiment, the general-purpose detection unit may acquire orientation information and/or size information and store orientation information and/or size information in the past history storage unit, and subsequently, the framing adjustment unit may detect a deviation in the acquired information in a similar way to the first exemplary embodiment, and execute a framing adjustment. The detailed procedure will be omitted which is similar to the description above. FIG. 11B illustrates an example of past history information in the general-purpose detection unit case. FIG. 11B lists stored object information and body information related to each of the relevant pieces of image pickup data.

Further, in the first exemplary embodiment, a deviation in individual objects is evaluated in the face size information "large", "medium", and "small" to be captured, in the past history information. Alternatively, for example, the three patterns of the face size information may be replaced with three moving image camera work types "pan camera work moving image", "tilt camera work moving image", and "zoom camera work moving image" to determine whether individual objects are captured without a deviation in the camera work types.

In the first exemplary embodiment, the described method uses all the imaging histories acquired in the past to perform image capturing without a deviation in the framing including the face size or in the number of captured images of each object.

On the other hand, for example, when an imaging location changes from a location where a party has taken place to a public park, it is highly likely that objects themselves have changed. In such a case, using all the imaging histories acquired in the past makes it impossible to correctly determine whether a deviation has occurred in the number of captured images of each object and/or in the face size information about the captured object, which are stored in the imaging histories. A similar issue may also occur when imaging is executed on and beyond a date. To address the issue, additionally, a deviation in the face size of a captured object is checked by a changed imaging location or date being detected and by the past imaging history information being narrowed down to the past imaging history information acquired after the imaging location changed.

According to a second exemplary embodiment, a method is specifically described in which a reference range of a past imaging history is limited based on a past imaging location and/or an imaging time and in which whether there is a deviation in the face size of a captured object is checked.

Figure 12:
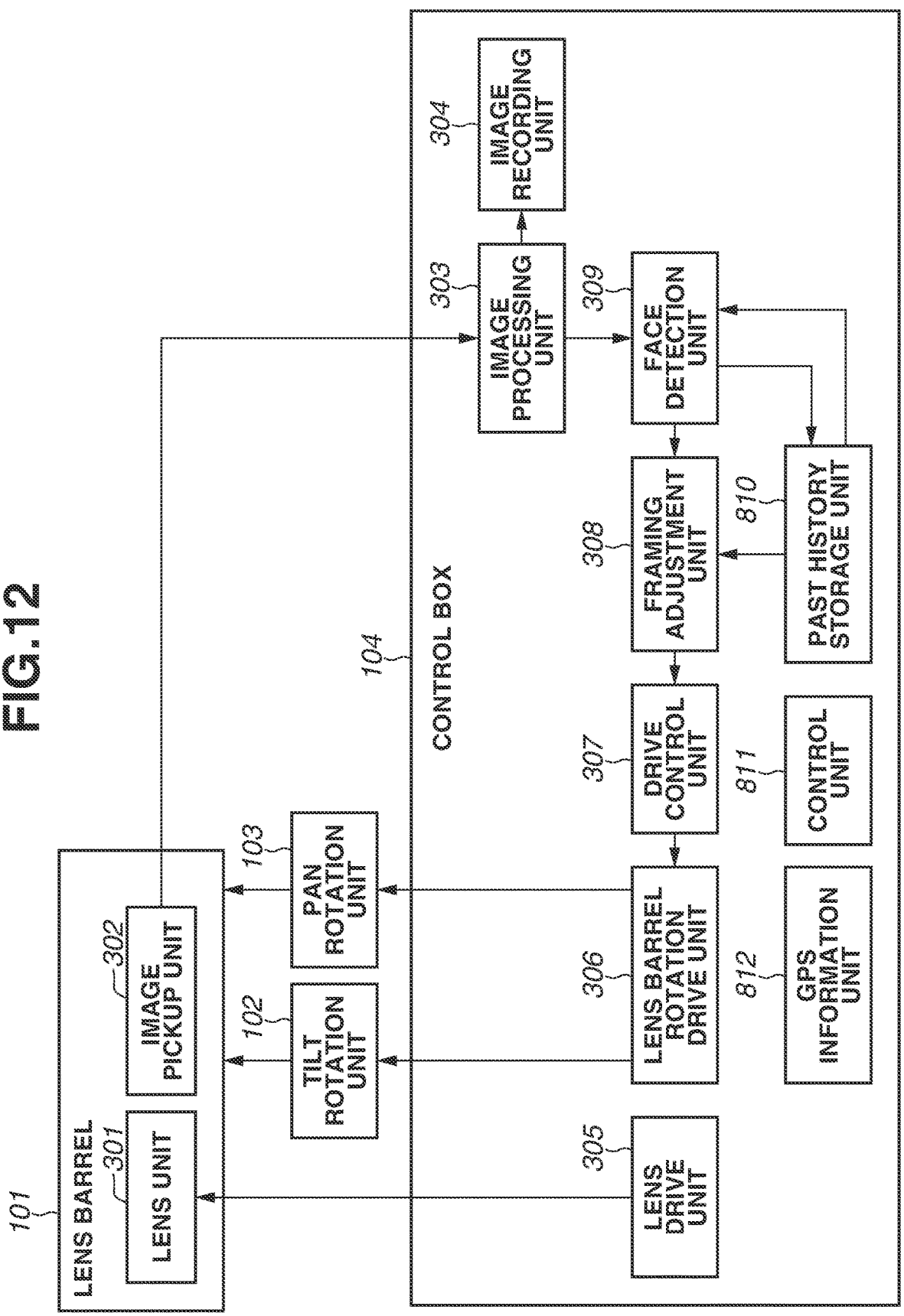
FIG. 12 is a block diagram illustrating a configuration of an image capturing apparatus according to a second exemplary embodiment.

FIG. 12 is a diagram illustrating a configuration of the image capturing apparatus 100 according to the second exemplary embodiment of the present disclosure. In FIG. 12, because the lens barrel 101, the tilt rotation unit 102, and the pan rotation unit 103 have functions identical with those in the first exemplary embodiment, the same numbers refer to them, and the description thereof is omitted. In the control box 104 in FIG. 12, a past history storage unit 810, a control unit 811, and a Global Positioning System (GPS) information unit 812 described below are functional units different from the first exemplary embodiment. The other units have functions identical with those of the first exemplary embodiment, therefore, the same numbers refer to them, and the description thereof is omitted.

When the past history storage unit 810 stores past history information as in the first exemplary embodiment, the past history storage unit 810 receives and records unique location ID information indicating imaging location information from the GPS information unit 812 described below.

The control unit 811 controls each block of the second exemplary embodiment. The specific control will be described below.

The GPS information unit 812 is a GPS receiver that receives a GPS signal. The GPS receiver receives latitude and longitude information, which is position information, from GPS satellites. The received information is converted into unique location ID information indicating the imaging location information, and the location ID information is stored in the past history storage unit 810. The GPS information unit 812 monitors the latitude information and the longitude information which are position information received from the GPS satellites. When the latitude information and/or the longitude information changes, the GPS information unit 812 changes the location ID information and stores the changed location ID information in the past history storage unit 810. Examining the location ID information makes it possible to check whether the image capturing apparatus 100 has moved.

Figure 13:
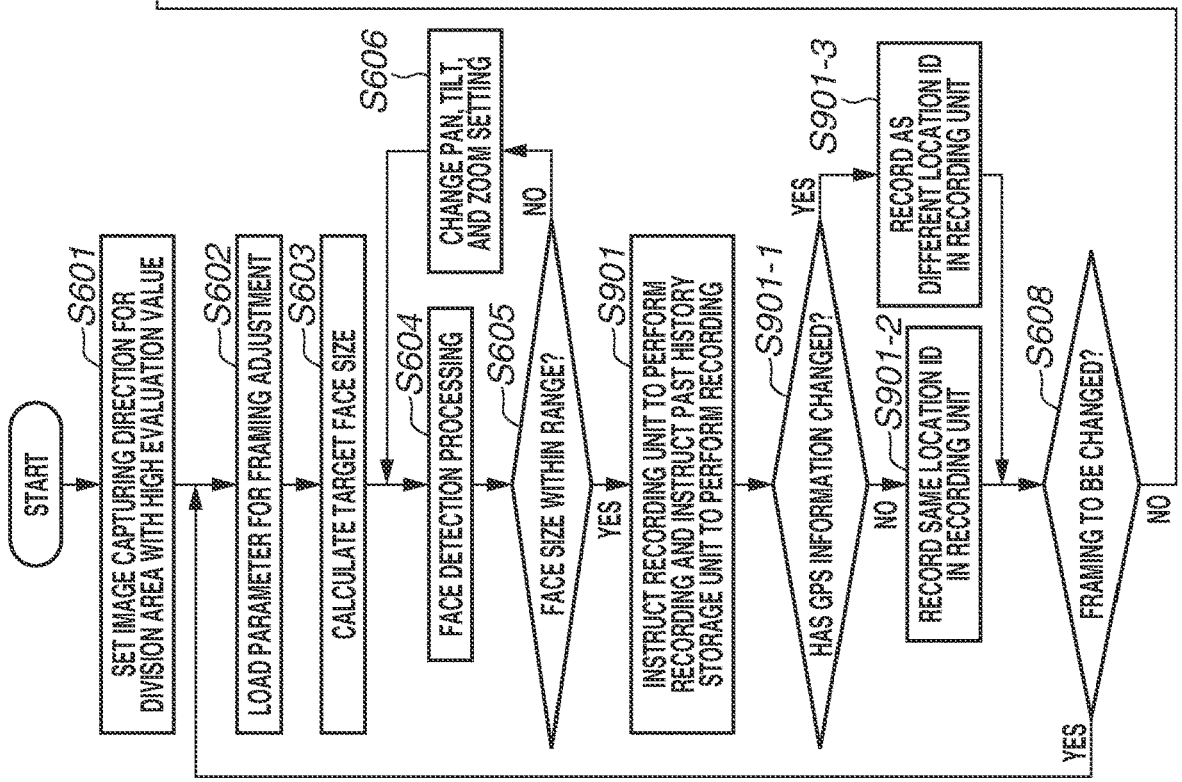
FIG. 13 is a flowchart illustrating the second pre-image capturing framing adjustment with a limited reference range according to the second exemplary embodiment.

Referring to FIG. 13, a pre-image capturing framing adjustment process will be described that checks whether there is a deviation in the face size of a captured object based on imaging history information with a reference range limited using the imaging location information to achieve uniformly capturing.

FIG. 13 is a flowchart that illustrates the operation of the second exemplary embodiment. In FIG. 13, additional processing that limits a reference range of the past imaging history, which will be described below, is added to the pre-image capturing framing adjustment processing illustrated in FIG. 6 of the first exemplary embodiment. The differences between the pre-image capturing framing adjustment flowcharts in FIGS. 13 and 6 are steps S901, S901-1, S901-2, S901-3, and S902. The other features are identical with those of the first exemplary embodiment, and therefore the same numbers refer to them, whose description will be omitted.

As in the first exemplary embodiment, the first pre-image capturing framing adjustment processing is executed in steps S601 to S606 in FIG. 13 to automatically track an object to execute a series of object imaging to store the captured image data in the image recording unit 304.

As in the first exemplary embodiment, in the second exemplary embodiment, image data after the first pre-image capturing framing adjustment is acquired two or more times in step S901.

The face detection unit 309 uses the image data to store detected face information in the past history storage unit 810.

In addition to the information, in the second exemplary embodiment, the location ID information which is the imaging location information acquired from the GPS information unit 812 is also recorded in the past history storage unit 810 in the next step.

The GPS information unit 812 monitors whether the image capturing apparatus 100 has moved (S901-1). If the image capturing apparatus 100 has not moved, the same location ID information as before the movement is stored in the past history storage unit 810 (S901-2). If the image capturing apparatus 100 has moved, location ID information different from that before the movement is stored in the past history storage unit 810 (S901-3).

In the second exemplary embodiment, a range of the second pre-image capturing framing is determined using the past history information. Specifically, in step S902, the control unit 811 refers to the past history information, detects the imaging location information that has changed, and determines a range of the past history information to be used, without using the past history information acquired before the change.

Executing such a control makes it possible to detect an imaging location that has changed, eliminating a detection process of a deviation in the framing of an object and/or a zoom image. After detecting a change of the imaging location and determining that a framing adjustment is unnecessary, a new automatic imaging may be started, for example, by re-searching the vicinity for an object.

FIG. 14 illustrates an example of information stored in the past history storage unit 810 according to the second exemplary embodiment. In FIG. 14, it can be found that the location ID information has changed from 1 to 2 in the last acquired related image pickup data name IMG_1000. From the location ID information in the past history storage unit 810, the image capturing apparatus 100 recognizes that the imaging of IMG_1000 is started at a new location, determines that no deviations have occurred yet until this time, differently from the first exemplary embodiment. Therefore imaging through the first pre-image capturing framing adjustment is continued, without executing the second pre-image capturing framing adjustment.

As described above, even if an imaging location changes, limiting a reference range of the past imaging history makes it possible to correctly determine whether a deviation has occurred in the face size information about a captured object stored in the past history. Whereas the reference range of the past history is limited using the location ID information in the second exemplary embodiment, the reference range of the past history may be limited based on a change of the date using time information acquired from the GPS unit. Alternatively, the reference range of the past history may be limited through a detection of a change in orientation by an orientation information acquisition sensor such as a gyro sensor that can recognize whether the image capturing apparatus has moved, instead of the GPS information. Whereas the reference range of the past history is limited using the location ID information in the second exemplary embodiment, the location ID information may be assigned as scene ID information to each scene such as a scene in a ceremony or each scene where the ceremony warms up for a determination of whether a scene has changed, and the reference range of the past history may be limited in a similar way. That can be achieved only by replacing the GPS information unit with a recognition unit that recognizes a scene from image pickup data, of which the detailed description will be omitted.

According to the exemplary embodiments described above, it is possible to provide an image capturing apparatus that captures individual objects much more uniformly with various framings, compared with the prior art.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2019-180366, filed Sep. 30, 2019, which is hereby incorporated by reference herein in its entirety.

What is claimed is:

1. An image capturing apparatus comprising:
an image pickup device configured to output image data; and
at least one processor programmed to perform operations of:
an acquisition unit configured to acquire object information based on the image data; and
a determination unit configured to determine a framing in execution of an imaging operation; and
a past history storage unit configured to store imaging information about each object, the imaging information including framing information about past imaging of each object,
wherein the determination unit determines the framing in execution of the imaging operation according to past imaging information stored in the past history storage unit and the object information,
wherein the past imaging information stored in the past history storage unit is information about a type of moving image camera work including at least one of a pan camera work moving image, a tilt camera work moving image, and a zoom camera work moving image, and
wherein, based on the past imaging information stored in the past history storage unit and the object information, the determination unit judges whether imaging is being performed with moving image camera work without an imbalance for each object or not, and determines the framing in execution of the imaging operation.

2. The image capturing apparatus according to claim 1, further comprising:
a first calculation unit configured to calculate at least one of a pan control amount and a tilt control amount for the image pickup device to allow a target object to be included in the framing determined by the determination unit; and
a first drive control unit configured to change an orientation of the image pickup device according to the at least one of the calculated pan control amount and tilt control amount.

3. The image capturing apparatus according to claim 1, further comprising:
a second calculation unit configured to calculate a zoom control amount for the image pickup device to allow a target object to be included in the framing determined by the determination unit; and
a second drive control unit configured to change a zoom magnification of the image pickup device according to the calculated zoom control amount.

4. The image capturing apparatus according to claim 2, wherein the first calculation unit calculates at least one of the pan control amount and the tilt control amount according to a face size of a previously captured person.

5. The image capturing apparatus according to claim 3, wherein the second calculation unit calculates the zoom control amount according to a face size of a previously captured person.

6. The image capturing apparatus according to claim 1,
wherein the imaging information includes at least one of a change in imaging time, a change in imaging location, and a change in imaging scene, and
wherein the determination unit determines a reference range of the past imaging information stored in the past history storage unit, based on the at least one of the change in imaging time, the change in imaging location, and the change in imaging scene.

7. The image capturing apparatus according to claim 1, wherein a recording of the image data by the imaging operation is carried out a plurality of times when a scene is determined to be an important scene.

8. The image capturing apparatus according to claim 7, further comprising a learning unit configured to learn a favorite of a user based on an appearance frequency of at least one of an object, an expression of an object, and a framing on image data recorded in the past imaging,
wherein the scene is determined to be the important scene by the learning unit determining the scene to be the favorite of the user.

9. An image capturing apparatus comprising:
an image pickup device configured to output image data;
at least one processor programmed to perform operations of:
an acquisition unit configured to acquire object information based on the image data; and
a determination unit configured to determine a framing in execution of an imaging operation; and
a past history storage unit configured to store imaging information including framing information about past imaging,
wherein the determination unit determines the framing in execution of the imaging operation according to a plurality of pieces of past imaging information stored in the past history storage unit and the object information,
wherein the past imaging information stored in the past history storage unit is information about a type of moving image camera work including at least one of a pan camera work moving image, a tilt camera work moving image, and a zoom camera work moving image, and
wherein, based on the past imaging information stored in the past history storage unit, the determination unit judges whether imaging is being performed with moving image camera work without an imbalance for each object or not, and determines the framing in execution of the imaging operation.

10. The image capturing apparatus according to claim 9, further comprising:
a first calculation unit configured to calculate at least one of a pan control amount and a tilt control amount for the image pickup device to allow a target object to be included in the framing determined by the determination unit; and
a first drive control unit configured to change an orientation of the image pickup device according to the at least one of the calculated pan control amount and the calculated tilt control amount.

11. The image capturing apparatus according to claim 9, further comprising:
a second calculation unit configured to calculate a zoom control amount for the image pickup device to allow a target object to be included in the framing determined by the determination unit; and
a second drive control unit configured to change a zoom magnification of the image pickup device according to the calculated zoom control amount.

12. The image capturing apparatus according to claim 9,
wherein the imaging information includes at least one of a change in imaging time, a change in imaging location, and a change in imaging scene, and
wherein the determination unit determines a reference range of the past imaging information stored in the past history storage unit, based on the at least one of the change in imaging time, the change in imaging location, and the change in imaging scene.

13. The image capturing apparatus according to claim 9, wherein a recording of the image data by the imaging operation is carried out a plurality of times when a scene is determined to be an important scene.

14. The image capturing apparatus according to claim 13, further comprising a learning unit configured to learn a favorite of a user based on an appearance frequency of at least one of an object, an expression of an object, and a framing on image data recorded in the past imaging,
wherein the scene is determined to be the important scene by the learning unit determining the scene to be the favorite of the user.

15. A control method of an image capturing apparatus including an image pickup device that outputs image data, the control method comprising:
acquiring object information based on the image data;
determining a framing in execution of an imaging operation; and
storing imaging information about each object, the imaging information including framing information about past imaging of each object,
wherein the framing in execution of the imaging operation is determined in the determining according to past imaging information stored in the storing and the object information,
wherein the past imaging information stored in the past history storage unit is information about a type of moving image camera work including at least one of a pan camera work moving image, a tilt camera work moving image, and a zoom camera work moving image, and
wherein, based on the past imaging information stored in the past history storage unit and the object information, the determination unit judges whether imaging is being performed with moving image camera work without an imbalance for each object or not, and determines the framing in execution of the imaging operation.

16. A control method of an image capturing apparatus including an image pickup device that outputs image data, the control method comprising:
acquiring object information based on the image data;
determining a framing in execution of an imaging operation; and
storing imaging information including framing information about past imaging,
wherein the framing in execution of the imaging operation is determined in the determining according to a plurality of pieces of past imaging information stored in the storing and the object information,
wherein the past imaging information stored in the past history storage unit is information about a type of moving image camera work including at least one of a pan camera work moving image, a tilt camera work moving image, and a zoom camera work moving image, and
wherein, based on the past imaging information stored in the past history storage unit, the determination unit judges whether imaging is being performed with moving image camera work without an imbalance for each object or not, and determines the framing in execution of the imaging operation.

17. A non-transitory computer-readable medium storing a program for causing a computer, which is included in an image capturing apparatus including an image pickup device that outputs image data, to function as:
an acquisition unit configured to acquire object information based on the image data;
a determination unit configured to determine a framing in execution of an imaging operation; and
a past history storage unit configured to store imaging information about each object, the imaging information including framing information about past imaging of each object,
wherein the determination unit determines the framing in execution of the imaging operation according to past imaging information stored in the past history storage unit and the object information,
wherein the past imaging information stored in the past history storage unit is information about a type of moving image camera work including at least one of a pan camera work moving image, a tilt camera work moving image, and a zoom camera work moving image, and
wherein, based on the past imaging information stored in the past history storage unit and the object information, the determination unit judges whether imaging is being performed with moving image camera work without an imbalance for each object or not, and determines the framing in execution of the imaging operation.

18. A non-transitory computer-readable medium storing a program for causing a computer, which is included in an image capturing apparatus including an image pickup device that outputs image data, to function as:
an acquisition unit configured to acquire object information based on the image data;
a determination unit configured to determine a framing in execution of an imaging operation; and
an acquisition unit configured to acquire object information based on the image data;
a determination unit configured to determine a framing in execution of an imaging operation; and
a past history storage unit configured to store imaging information including framing information about past imaging,
wherein the determination unit determines the framing in execution of the imaging operation according to a plurality of pieces of past imaging information stored in the past history storage unit and the object information,
wherein the past imaging information stored in the past history storage unit is information about a type of moving image camera work including at least one of a pan camera work moving image, a tilt camera work moving image, and a zoom camera work moving image, and
wherein, based on the past imaging information stored in the past history storage unit, the determination unit judges whether imaging is being performed with moving image camera work without an imbalance for each object or not, and determines the framing in execution of the imaging operation.

* * * * *